(12) United States Patent
Lunati et al.

(10) Patent No.: US 9,157,526 B2
(45) Date of Patent: Oct. 13, 2015

(54) LOCKUP CLUTCH MODULATION SYSTEM AND METHOD

(71) Applicants: Jonathan Lunati, Germantown, TN (US); Justin Morse, Memphis, TN (US); Cody Mayer, Germantown, TN (US); Bradley Brown, Southaven, MS (US); Brian Reese, Collierville, TN (US)

(72) Inventors: Jonathan Lunati, Germantown, TN (US); Justin Morse, Memphis, TN (US); Cody Mayer, Germantown, TN (US); Bradley Brown, Southaven, MS (US); Brian Reese, Collierville, TN (US)

(73) Assignee: TCI AUTOMOTIVE, L.L.C., Ashland, MS (US)

( * ) Notice: Subject to any disclaimer, the term of this patent is extended or adjusted under 35 U.S.C. 154(b) by 144 days.

(21) Appl. No.: 13/918,116

(22) Filed: Jun. 14, 2013

(65) Prior Publication Data
US 2014/0367214 A1      Dec. 18, 2014

(51) Int. Cl.
*F16H 61/14*      (2006.01)

(52) U.S. Cl.
CPC .......... *F16H 61/14* (2013.01); *F16H 2061/145* (2013.01)

(58) Field of Classification Search
CPC ...................................................... F16H 61/142
See application file for complete search history.

(56) References Cited

U.S. PATENT DOCUMENTS

| | | | | |
|---|---|---|---|---|
| 3,693,478 | A * | 9/1972 | Malloy | 477/65 |
| 4,373,617 | A * | 2/1983 | Mathues | 192/3.31 |
| 6,367,605 | B1 * | 4/2002 | Middelmann et al. | 192/3.3 |
| 2011/0166757 | A1 * | 7/2011 | Otanez et al. | 701/60 |

* cited by examiner

*Primary Examiner* — Richard Lorence
(74) *Attorney, Agent, or Firm* — Sorell, Lenna & Schmidt, LLP (57) ABSTRACT

A torque converter includes an input connected to an engine. An output is connected with a transmission. A lockup clutch is connected with the output and is disposed to engage the input to couple the input with the output via an apply pressure corresponding to a target lockup strategy based on at least one vehicle operating condition. A pressure regulator is configured to modulate the apply pressure. Systems and methods are disclosed.

20 Claims, 8 Drawing Sheets

LOCKUP CLUTCH MODULATION SYSTEM AND METHOD

TECHNICAL FIELD

The present disclosure generally relates to power transmission systems including a torque converter interface between an engine and a transmission, and more particularly to a system and method for controlling a torque converter clutch.

BACKGROUND

Vehicle powertrains can include an internal combustion engine connected to an automatic transmission via a coupling device, for example, a torque converter to transfer engine torque to the transmission. The torque converter provides a fluid coupling that transfers torque between an output shaft of the engine and an input shaft of the transmission. The fluid coupling creates a torque converter slip when an impeller of the torque converter connected with the output shaft rotates at a rate that is different than a turbine of the torque converter connected with the input shaft. In some examples, torque converters are designed to slip at low vehicle speeds to enable the transmission to rotate at a slower rate relative to the engine. As the vehicle speed increases and/or other threshold vehicle operating conditions are met, the slip rate gradually diminishes. However, fuel efficiency may be reduced and/or only a portion of available engine power utilized as a result of slip.

In some examples, torque converters can include a lockup clutch that joins the separate rotating turbine and impeller in a direct mechanical connection to minimize slip and improve transmission efficiency of the torque converter. Engagement of the clutch can be determined and applied in relation to threshold vehicle operating conditions. In some examples, control systems of a vehicle attempt to execute a target slip for the torque converter according to vehicle operating conditions and control an engagement force of the clutch until the clutch is fully engaged or locked up. This disclosure describes an improvement over these prior art technologies.

SUMMARY

In one embodiment, a torque converter is provided. The torque converter includes an input connected to an engine. An output is connected with a transmission. A lockup clutch is connected with the output and is disposed to engage the input to couple the input with the output via an apply pressure corresponding to a target lockup strategy based on at least one vehicle operating condition. A pressure regulator is configured to modulate the apply pressure. In some embodiments, systems and methods are provided.

BRIEF DESCRIPTION OF THE DRAWINGS

The present disclosure will become more readily apparent from the specific description accompanied by the following drawings, in which.

DETAILED DESCRIPTION

The exemplary embodiments of a power transmitting system and related methods of use are discussed in terms of power transmission systems including a torque converter interface between an engine and a transmission and more particularly, in terms of a system and method for controlling a torque converter clutch. In one embodiment, the present system comprises a vehicle power transmitting system including a torque converter having a lockup clutch disposed to couple an impeller with a turbine via an apply pressure corresponding to a target lockup strategy based on at least one vehicle operating condition. In one embodiment, the torque converter includes a pressure regulator disposed adjacent the lockup clutch and configured to modulate the apply pressure.

In one embodiment, the vehicle power transmitting system includes an engine connected with a drive plate, a transmission connected with an input shaft and the torque converter including the impeller, the turbine and a casing connected with the drive plate. In one embodiment, the system includes a controller that includes a closed loop feedback control module that monitors and controls the target lockup strategy with the apply pressure and a release pressure.

In one embodiment, the pressure regulator includes a torque converter apply pressure modulation valve. In one embodiment, the present system is employed with a mechanical method of altering and/or tuning lockup clutch application through manipulation of commanded lockup circuit apply pressure.

In some embodiments, the present system and/or method can manipulate lockup apply pressure without modifying an existing transmission or control system. In some embodiments, the present system and/or method can tune lockup clutch application for a specific powertrain application. In some embodiments, the present system and/or method can be employed with a plurality of alternate and/or different torque capacity clutches in a closed-loop lockup control system without modifying an existing transmission, lockup strategy, or controls of an existing power transmitting system. In some embodiments, the present system and/or method can allow partial pressure exhausting in a low torque application while eliminating pressure exhaust in high torque scenarios. In some embodiments, the present system and/or method can run high stall torque converters in a closed loop feedback controlled system designed around low stall units without modification to an existing transmission or control system.

In some embodiments, an existing power transmitting system employs the present system and/or method to avoid undesirable modes of behavior of the power transmitting system, such as, for example, dropping desired slip rpm too rapidly causing driver discomfort and noise, dropping target slip rpm below system-targeted levels causing the closed loop control to over-correct by reducing apply pressure excessively, and/ or sinusoidal over and under application of the torque converter clutch resulting in hunting. In some embodiments, the present system and/or method modifies targets of a control system or modifies behaviors of monitored components to match targeted values for a given closed loop feedback control system.

In some embodiments, the present system and/or method manipulates commanded lockup circuit apply pressure through mechanical devices without altering control system values such that the control system remains unaltered, however, behavior of the components is manipulated to match the targeted behavior of the control system.

In one embodiment, the pressure regulator includes a centrifugally activated sprung mass, which allows for exhaust of a portion of apply pressure up to or starting at a given rpm. In one embodiment, the pressure regulator includes a plurality and/or a series of sprung masses centrifugally loaded based on RPM. In some embodiments, the sprung mass can include mass and spring combinations that tune clutch lockup behavior by regulating flow and/or pressure of fluid applied to the clutch. For example, as a mass of a sprung mass pressure regulator is forced against a spring radially outward, the mass opens and/or closes exhaust orifices. In some embodiments, the sprung mass adjusts the dimension of an orifice. In some embodiments, the adjustment can include uniform, constant, consistent, increasing, decreasing and/or gradual adjustment of the dimension of the exhaust orifice during opening and closing.

In one embodiment, the pressure regulator modifies clutch behavior via a marcel type spring placed on an opposing side of a lockup clutch piston to oppose apply pressure. In one embodiment, a system of the present disclosure includes a marcel spring such that, up to a threshold commanded pressure, the marcel spring resists a portion of the apply pressure and achieves a lower torque capacity for a selected clutch design. In one embodiment, a system of the present disclosure includes a marcel spring such that, at higher commanded pressures for higher torque capacity applications, the lockup clutch overcomes the marcel spring and the clutch torque capacity is raised. In one embodiment, the marcel spring is employed with a clutch apply surface such that a variable area can be achieved. The marcel spring mechanically modifies the net effect of the applied pressure.

In one embodiment, the pressure regulator includes a spool valve and a spring to mechanically manipulate commanded apply pressure to match control system target parameters. In some embodiments, the pressure regulator can include a single or a plurality or series of valves and springs of the same or varying diameters and fluid flow rates.

In one embodiment, the pressure regulator includes a spool valve, which communicates with a fluid pathway of the lockup pressure circuit, and is positioned in a bore of a lockup clutch hub having two orifices exposed to an apply pressure side of a lockup pressure circuit. In one embodiment, a first orifice of the bore is located adjacent a top surface of the spool valve such that a cross sectional area of the spool valve is exposed to the apply pressure circuit. In one embodiment, the first orifice is configured as a pressure sensing portion of the spool valve to allow pressure to act on the spool valve and oppose the resulting force with a spring. In one embodiment, the net force applied to the spool valve dictates the cross sectional area of a second orifice of the bore on the pressure side.

In one embodiment, the second orifice is an entrance to the bore comprising an exhaust or bypass of the fluid pathway. In one embodiment, upon initial application of apply pressure, the spool valve and the spring exhaust at least a portion of the apply pressure and the lockup circuit does not build sufficient pressure to achieve the desired slip rpm of the lockup clutch and the control system target slip rpm is not immediately achieved. As the feedback control increases apply pressure to reach the target slip value, the first orifice facilitates pressure sensing with the spool valve top surface and the spool valve compresses the spring. The second or exhaust orifice decreases in area, thus allowing a higher pressure to be obtained in the lockup circuit. In some embodiments, valve diameter and spring rate are calibrated to modulate clutch apply pressure for adaptation of the torque converter into a closed loop feedback control system of an existing power transmitting system.

In some embodiments, the spool valve and the spring are configured for maximum torque capacity over a progressive/modulated application of the lockup clutch such that the spool valve is tuned to completely close the exhaust orifice. In some embodiments, the spool valve and the spring are configured for normal operating pressures commanded in a control system for low torque capacity, such as, for example, cruising speed, city driving and/or light throttle pedal applications such that the spool valve is actively modulating the actual apply pressure. In some embodiments, the spool valve and the spring are configured for high torque capacity, such as, for example, highway speed and/or wide open throttle applications such that the spool valve and the spring are calibrated to fully close the exhaust orifice, which facilitates 100% lockup pressure in a control system.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a vehicle power transmitting system, related components and methods of modulating a torque converter clutch in accordance with the principles of the present disclosure. Alternate embodiments are also disclosed. Reference will now be made in detail to the exemplary embodiments of the present disclosure, which are illustrated in the accompanying figures. Turning to FIGS. 1-6, there are illustrated components of a vehicle power transmitting system 20.

The components of system 20 can be fabricated from materials suitable for power transmission systems, including metals, synthetic polymers, ceramics, and/or their composites. For example, the components of system 20, individually or collectively, can be fabricated from materials such as stainless steel alloys, titanium alloys, cobalt-chrome alloys, thermoplastics, polyethylene terephthalate (PET), fabric, silicone, polyurethane, silicone-polyurethane copolymers, polymeric rubbers, polyolefin rubbers, semi-rigid and rigid materials, elastomers, thermoplastic elastomers, thermoset elastomers, elastomeric composites, rigid polymers including polyphenylene, polyamide, polyimide, polyetherimide, polyethylene, epoxy, and their combinations. Various components of system 20 may have material composites, including the above materials, to achieve various desired characteristics such as strength, rigidity, elasticity, compliance, and durability. The components of system 20, individually or collectively, may also be fabricated from a heterogeneous material such as a combination of two or more of the above-described materials. The components of system 20 may be monolithically formed, integrally connected or include fastening elements and/or instruments, as described herein.

System 20 includes powertrain components of a vehicle 10. The powertrain components include an internal combustion engine 22, an automatic transmission 24, a torque converter 26 and a lockup clutch, such as, for example, a torque converter clutch (TCC) 28. Engine 22 drives transmission 24 via torque converter 26. Air is drawn into an intake manifold (not shown) of engine 22 via a throttle (not shown). The air is mixed with fuel and the air/fuel mixture is combusted within cylinders (not shown) to reciprocally drive pistons (not shown) within the cylinders. The pistons rotatably drive a crankshaft (not shown) to provide engine/drive torque. Exhaust generated by the combustion process is exhausted from engine 22 through an exhaust manifold (not shown). In some embodiments, system 20 can have an engine with one or a plurality of cylinders and/or pistons.

The crank shaft is connected with a drive plate 30. Drive plate 30 communicates with engine 22 for transmitting engine torque to transmission 24. An output shaft 32 of engine 22 is coupled to an end 34 of torque converter 26. Transmission 24 is connected with an input shaft 36. Input shaft 36 is coupled to an opposite end 38 of torque converter 26. The engine torque is transferred through torque converter 26 to drive transmission 24. In some embodiments, transmission 24 can include an automatic transmission, an automated manual transmission and a continuously variable transmission. In some embodiments, transmission 24 includes a plurality of pre-defined, fixed gear ratios.

Torque converter 26 is positioned between engine 22 and transmission 24. Torque converter 26 provides a mechanical engagement and disengagement of engine 22 from transmission 24. This disengagement enables vehicle 10 to stop without engine 22 stalling and to multiply the torque delivered to transmission input shaft 36 from engine output shaft 32.

Torque converter 26 includes an input that comprises an impeller 42 connected to engine 22 such that impeller 42 rotates with engine output shaft 32. Torque converter 26 includes an output that comprises a turbine 44 connected with input shaft 36 of transmission 24 such that input shaft 36 rotates with turbine 44. Impeller 42 and turbine 44 are rotatably connected. In some embodiments, torque converter 26 employs fluid, such as, for example, hydraulic fluid to facilitate fluid coupling of the input and the output of torque converter 26 and fluid transfer of rotational energy from impeller 42 to turbine 44 so that the rotation of impeller 42 causes turbine 44 to rotate.

Torque converter 26 includes a stator 46 disposed between impeller 42 and turbine 44 to aid in the transfer of the hydraulic fluid between impeller 42 and turbine 44. Torque converter 26 includes a stator support 48 disposed within a central bore of stator 46 to limit rotation of stator 46 in one direction. As the rotating hydraulic fluid is drawn into impeller 42 from turbine 44, the hydraulic fluid contacts stator 46. Once the hydraulic fluid contacts blades of stator 46, the direction of rotation of the hydraulic fluid is re-aligned with the direction of rotation of impeller 42 to enhance efficiency and multiply torque.

The input of torque converter 26 comprises a casing 50 connected with drive plate 30. Casing 50 includes an inner surface 52 that defines a cavity 54 configured for disposal of impeller 42 and turbine 44. Inner surface 52 is integrally connected with impeller 42 such that casing 50 and impeller 42 rotate as drive plate 30 and engine 22 rotate.

In some embodiments, the rotational velocity of impeller 42 relative to turbine 44 is different to create a converter slip therebetween. In some embodiments, the slip or relative difference in rotational velocities of impeller 42 and turbine 44 enable engine 22 to achieve a higher engine speed, for example, revolutions per minute (RPM) before input shaft 36 begins to rotate to overcome static inertia and improve acceleration of vehicle 10. TCC 28 mechanically transfers torque across torque converter 26 in a fully locked or a controlled slip operating configuration. When activated, TCC 28, which is connected with turbine 44 as described herein, frictionally engages casing 50 to reduce slip under certain driving and/or vehicle operating conditions. For example, after a rapid increase in engine torque corresponding to a significant increase in throttle request 56, the vehicle increases engine speed and torque converter clutch slip. A TCC apply pressure is commanded, as described herein, to a value that allows a timely increase in engine speed and does not compromise the torque converter clutch hardware.

In some embodiments, TCC 28 is engageable with casing 50 such that impeller 42 is coupled with turbine 44 in a plurality of operating configurations that include fully released fluid coupling, fully locked direct mechanical coupling, and a controlled slip coupling. TCC 28 mechanically and fluidically couples impeller 42 and turbine 44, and includes a pressure regulator described herein, which selectively modulates an allowed slip therebetween.

For example, in the fully released fluid coupling operating configuration, TCC 28 is disengaged and impeller 42 is fluidically coupled with turbine 44 to establish slip and all torque transfer across torque converter 26 is by fluid coupling with no mechanical torque transfer across TCC 28. In the fully locked mechanical coupling operating configuration, TCC 28 is fully and directly engaged with casing 50 and there is no slip between impeller 42 and turbine 44. All torque transfer across torque converter 26 is via direct mechanical coupling across TCC 28. In the controlled slip coupling operating configuration, the slip across torque converter 26 is controlled by controlling the apply pressure of TCC 28 with casing 50. The apply pressure controls the application force across TCC 28. TCC 28 apply pressure is controlled so that the torque converter slip approaches a selected value. By reducing the apply pressure in TCC 28, torque converter slip will increase. By increasing the apply pressure in TCC 28, torque converter slip will decrease.

TCC 28 is connected with turbine 44 and is disposed to engage casing 50 and/or impeller 42 to couple impeller 42 with turbine 44 via an apply pressure. When TCC 28 is engaged to casing 50, turbine 44 becomes coupled to casing 50 via the connection between TCC 28 and turbine 44. In a fully locked operating configuration, TCC 28 causes turbine 44 to rotate with impeller 42 and/or casing 50. The apply pressure includes, such as, for example, a pressure applied to TCC 28 by hydraulic fluid, such as, for example, transmission fluid, to force a piston of TCC 28 into frictional engagement with casing 50. The greater the apply pressure transferred to TCC 28, the greater the frictional engagement between TCC 28 and casing 50, and in turn, a lower slip between impeller 42 and turbine 44. A TCC apply pressure command 62 causes release of hydraulic fluid to an apply pressure circuit of torque converter 26 to control slip in response to vehicle operating conditions. In one embodiment, a pressure regulator of torque converter 26, described herein, modulates apply pressure by exhausting apply pressure.

Figure 5:
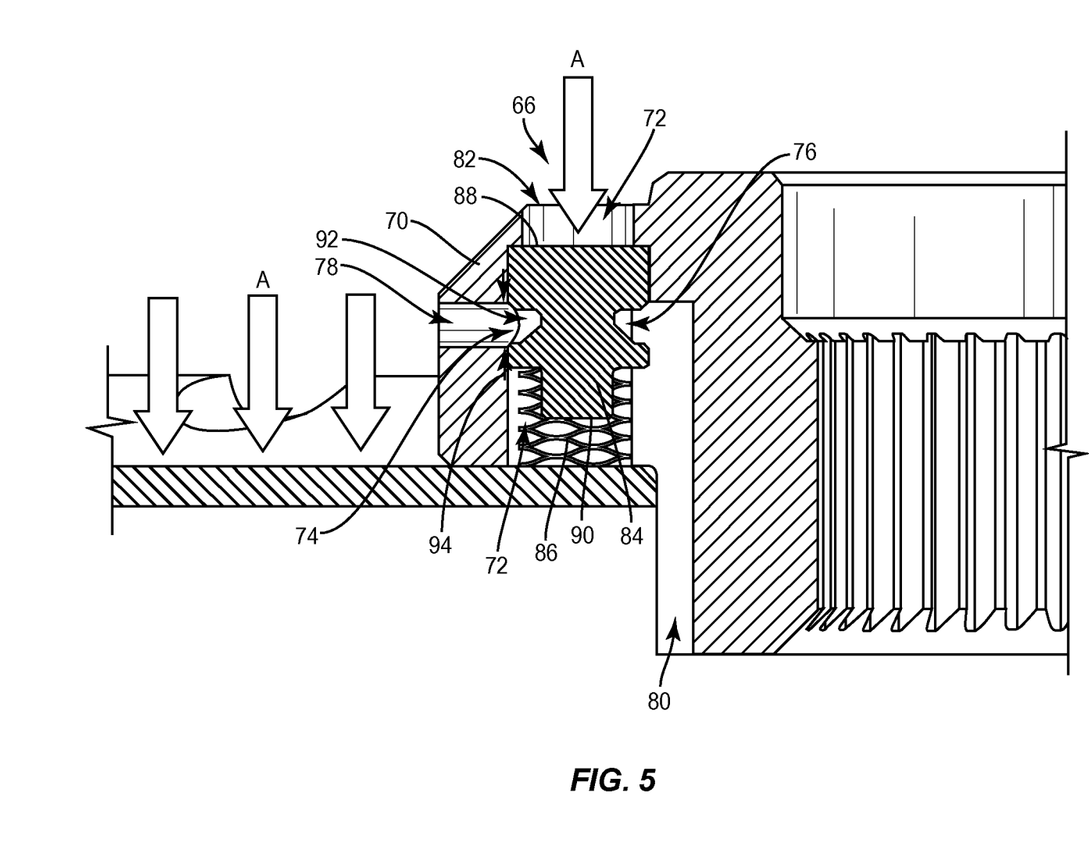
FIG. 5 is an enlarged break away view of the components shown in FIG. 2.
Figure 6:
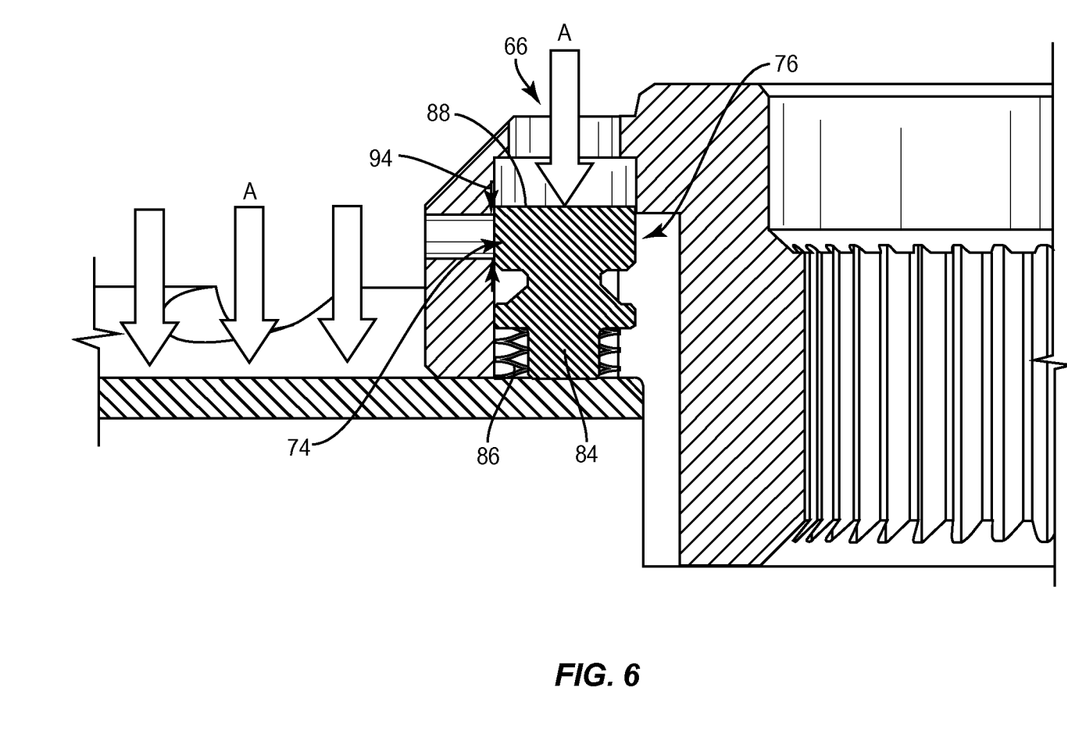
FIG. 6 is an enlarged break away view of the components shown in FIG. 2.

Torque converter 26 includes a hub 70 configured for disposal of a pressure regulator, such as, for example, a modulating valve system 66, as shown in FIGS. 5 and 6. Hub 70 is connected with TCC 28 and input shaft 36 of turbine 44. Hub 70 is concentrically disposed about input shaft 36. Hub 70 includes an inner surface that defines a cavity 72. The inner surface of hub 70 defines an entrance opening 74 and an exit opening 76 disposed in communication with cavity 72. Cavity 72 is configured for disposal of a valve device of valve system 66. In some embodiments, valve system 66 is disposed in alternate positions or locations within torque converter 26. In some embodiments, the pressure regulator can be disposed in alternate positions or locations of system 20, such as, for example, transmission 24, a transmission pump and/or a valve body.

The inner surface of hub 70 defines a fluid pathway 78 that communicates with entrance opening 74, which is configured as an intake for the apply pressure. The inner surface of hub 70 defines a fluid pathway 80 that communicates with exit opening 76, which is configured to exhaust at least a portion of the apply pressure for modulating the apply pressure. The inner surface of hub 70 defines an opening 82 that facilitates application of the apply pressure to the valve device of valve system 66 such that the valve device senses apply pressure and causes translation of the valve device relative to hub 70 for modulating the apply pressure. In one embodiment, hub 70 defines a plurality of cavities 72 disposed circumferentially about hub 70. Each of the plurality of cavities 72 is configured for disposal of at least one valve device of valve system 66.

Valve system 66 is disposed adjacent TCC 28 and within hub 70. Valve system 66 is configured to modulate the apply pressure transmitted to TCC 28. The valve device of valve system 66 includes at least one valve, such as, for example, a spool valve 84 and a biasing member, such as, for example, a coil spring 86. Valve 84 and spring 86 are disposed in cavity 72. Valve 84 extends between a proximal end 88 and a distal end 90. Proximal end 88 is configured as a pressure sensing surface and is exposed to the apply pressure via opening 82.

Distal end 90 is configured to engage spring 86. Valve 84 includes an outer surface that defines a passageway, such as, for example, a recessed circumferential groove 92 disposed between ends 88, 90 and is configured for the passage of the apply pressure. Valve 84, entrance opening 74, and exit opening 76 define an exhaust orifice area 94 that modulates the apply pressure between a low torque and a high torque capacity applications.

Spring 86 resists and/or prevents the axial translation of valve 84 as apply pressure contacts proximal end 88 and valve 84 senses the apply pressure. In some embodiments, the biasing member may have a semi-rigid, rigid or elastic configuration, and/or have elastic properties similar to the material examples described herein, such that the biasing member provides a selective amount of expansion, contraction, collapse and/or extension. In some embodiments, the biasing member may include a plurality of separately attachable or connectable portions or sections, such as bands or loops, or may be monolithically formed as a single continuous element. In one embodiment, the biasing member includes an axial element, such as, for example, a flexible shaft. In one embodiment, the biasing member has a solid disc or sphere shape. In one embodiment, the biasing member has a tubular wall. In some embodiments, the biasing member may include an elastomeric member, clip, leaf spring, gravity induced configuration, pneumatic configuration, hydraulic configuration and/or lever.

In some embodiments, system 20 includes a controller that includes and/or communicates with a torque converter clutch pressure control solenoid (not shown), which is disposed external to casing 50 and remote from torque converter 26. The solenoid is commanded to force fluid flow along a fluid pathway to torque converter 26 such that apply pressure is directed to TCC 28 via a fluid pathway, described below, which is disposed within casing 50. The solenoid controls the apply pressure to TCC 28 based on current flow through its coil windings. The controller commands the solenoid to apply pressure to TCC 28 based on certain detected vehicle operating conditions. Valve system 66 is configured to modulate the apply pressure, transmitted to TCC 28 and torque converter 26, from the solenoid.

Figure 3:
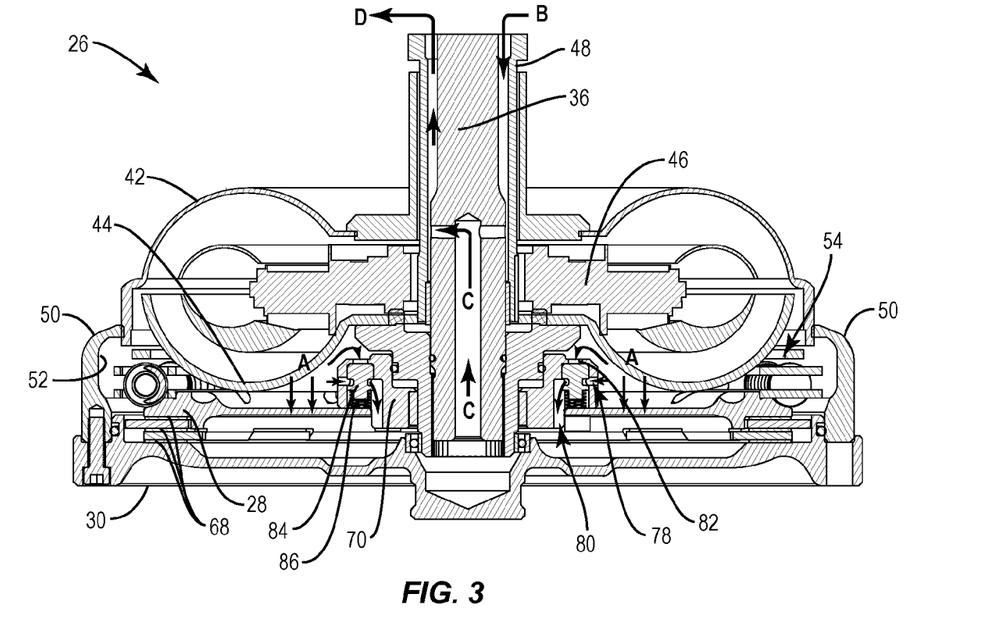
FIG. 3 is a side cross section view of components of the system shown in FIG. 1.

In one embodiment, as shown in FIG. 3, when vehicle operating conditions indicate that TCC 28 should be actuated, a control module 64 (FIG. 1) increases the current flow to allow the solenoid to direct fluid pressure via a valve (not shown) to the apply position proportional to solenoid pressure. The apply pressure enters a fluid pathway of torque converter 26 at a side of input shaft 36 adjacent transmission 24, as shown by arrow B in FIG. 3. The apply pressure travels through the fluid pathway of torque converter 26. The fluid pathway of torque converter 26 communicates with hub 70 including pathways 78, 80, valve system 66 and TCC 28. The apply pressure engages a piston of TCC 28 and valve system 66, in the direction shown by arrows A in FIG. 3. The fluid pressure in the lockup clutch apply pressure circuit travels along the closed fluid pathway between the solenoid and torque converter 26 between apply pressure operating configurations, as shown by arrows C and D in FIG. 3, and release pressure operating configurations, as shown by arrows E, F and G in FIG. 4.

Valve 84 is translatable for a modulated alignment, based on the apply pressure sensed by the proximal surface of valve 84, with entrance opening 74 and exit opening 76 for modulating the apply pressure. Valve 84 translates within cavity 72 between a first orientation, for example as shown in FIG. 5, and a second orientation, for example as shown in FIG. 6. In the first orientation, groove 92 of valve 84 is in alignment with fluid pathway 78 and exhaust orifice area 94 is at its maximum dimension such that the apply pressure is exhausted at a maximum flow rate through fluid pathway 78 and from hub 70 through fluid pathway 80. As the apply pressure exceeds a certain threshold amount, valve 84 will overcome the reaction force transmitted by spring 86 such that valve 84 translates, in direction shown by arrow A in FIGS. 5 and 6. As valve 84 translates, in the direction shown by arrow A, exhaust orifice area 94 decreases, reducing the amount of apply pressure permitted to exhaust through exit opening 76. With exhaust orifice area 94 reduced, the apply pressure to TCC 28 is increased.

Valve 84 modulates under pressure and the bias of spring 86 in cooperation with groove 92, openings 74, 76 and cavity 72 to alter and/or tune lockup clutch application through manipulation of commanded apply pressure. This configuration facilitates employment of torque converter 26 with an existing power transmission system, automatic transmission and/or control system. In some embodiments, the modulation configuration of torque converter 26, as described herein, can manipulate lockup apply pressure without modifying an existing transmission or control system, tune lockup clutch application for a specific powertrain application, be employed with a plurality of alternate and/or different torque capacity clutches, allow partial pressure exhausting in a low torque application while eliminating pressure exhaust in high torque scenarios, and/or run high stall torque converters in a system designed around low stall units without modification to an existing transmission or control system.

For example, as apply pressure is uniformly applied and/or uniformly increasingly applied, valve 84 continues to axially translate to the second orientation such that the dimension of exhaust orifice area 94 is reduced to substantially zero. With opening 74 and/or opening 76 being substantially blocked by valve 84, the apply pressure is prevented from being exhausted. In some embodiments, the apply pressure can be fully applied to the piston of TCC 28 and TCC 28 engages casing 50. As the apply pressure increases and engages the piston of TCC 28, friction plates 68 of TCC 28 engage casing 50 such that torque converter 26 is disposable in the fully locked mechanical coupling operating configuration and/or in a controlled slip operating configuration, as described herein. Friction plates 68 engage casing 50 such that impeller 42 and turbine 44 rotate at similar velocities, at a selected slip value.

Figure 4:
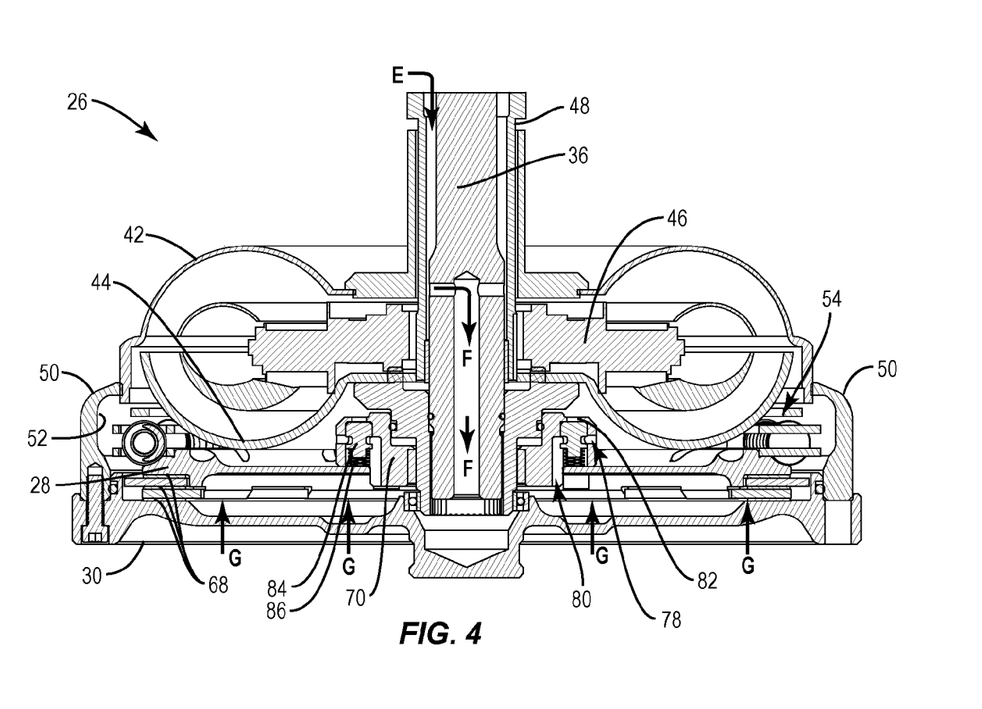
FIG. 4 is a side cross section view of components of the system shown in FIG. 1.

In some embodiments, as shown in FIG. 4, release of the application of TCC 28 is achieved by decreasing solenoid pressure to the apply side of the piston of TCC 28 and increasing pressure to the release side of the piston. Fluid pressure in the lockup clutch apply pressure circuit travels along the closed fluid pathway and is applied to the opposing side of the piston and/or the release side of TCC 28, as shown by arrows E, F and G in FIG. 4, to disengage friction plates 68 from casing 50. As such, TCC 28 is disposed in the fully released fluid coupling operating configuration. TCC 28 is disengaged and impeller 42 is fluidically coupled with turbine 44 to establish slip and all torque transfer across torque converter 26 is by fluid coupling with no mechanical torque transfer across TCC 28. The fluid pressure flows out of torque converter 26 through the pressure circuit to the solenoid.

In one embodiment, valve system 66, described herein, adjusts torque converter slip in response to changing operating conditions, such as, for example, those described herein. Control module 64, described herein, selects a particular slip and transmits a corresponding TCC apply pressure command 62 to TCC 28 for the current operating conditions, for example, engine speed, transmission gear and engine torque. The apply pressure command 62 transmitted is based on a pre-populated table that is stored in a controller 60 as a result of vehicle testing or other operations for a minimum torque converter slip that provides fuel economy and reduced vibration transfer. Valve system 66 resists or delays the effects of the apply pressure command 62 to temporarily maintain slip at a higher level than the target lockup strategy selected by control module 64.

The apply pressure generated and transmitted to TCC 28 corresponds to a target lockup strategy, such as, for example, a target slip based on at least one vehicle operating condition. In some embodiments, the vehicle operating conditions include a throttle position, engine speed, engine torque, turbine rotation speed, impeller rotation speed, oil temperature, manifold absolute pressure, manifold air temperature, engine coolant temperature, transmission fluid temperature, transmission input speed, transmission output speed and/or accelerator pedal position. In some embodiments, system 20 includes a plurality of sensors 58 (FIG. 1) configured to sense vehicle operating conditions. In some embodiments, system 20 can include a throttle position sensor, a manifold absolute pressure sensor, an engine speed sensor, a manifold air temperature sensor, a transmission fluid temperature sensor, a transmission manual shift shaft position switch assembly, a transmission input speed sensor, transmission fluid pressure switches, a transmission output speed sensor, an accelerator pedal position sensor, a brake switch, driver shift control switches, and operating mode selection switches. As the plurality of sensors 58 detect changes in certain vehicle operating conditions, e.g., engine torque, a target lockup strategy will be selected that corresponds to the detected vehicle operating conditions. System 20 attempts to reach the selected target lockup strategy by increasing or decreasing the amount of apply pressure applied to TCC 28.

In one embodiment, system 20 includes controller 60, which may include an engine controller and a transmission controller. In some embodiments, the controlling functions can be served by a single device or a plurality of communicatively connected devices. In some embodiments, controller 60 includes a plurality of electronic controllers and electronically controlled transmission components. In some embodiments, the components of controller 60 include a transmission control module, an engine control module, a body control module, an electronic brake and traction control module, a diagnostic link connector, a line pressure control solenoid, pressure control solenoids, torque converter clutch pressure control solenoid and shift solenoids. In some embodiments, the module may include an application specific integrated circuit, an electronic circuit, a processor (shared, dedicated, or group) and memory that execute one or more software or firmware programs, a combinational logic circuit, central processing unit(s) (for example, microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. In some embodiments, controller 60 has a set of control algorithms, including software program instructions and calibrations stored in memory and executed to provide the desired functions. In some embodiments, the algorithms are executed during preset loop cycles. In some embodiments, algorithms are executed, such as by a central processing unit, and or operable to monitor inputs from sensing devices and other network controllers, and execute control and diagnostic routines to control operation of actuators.

Figure 1:
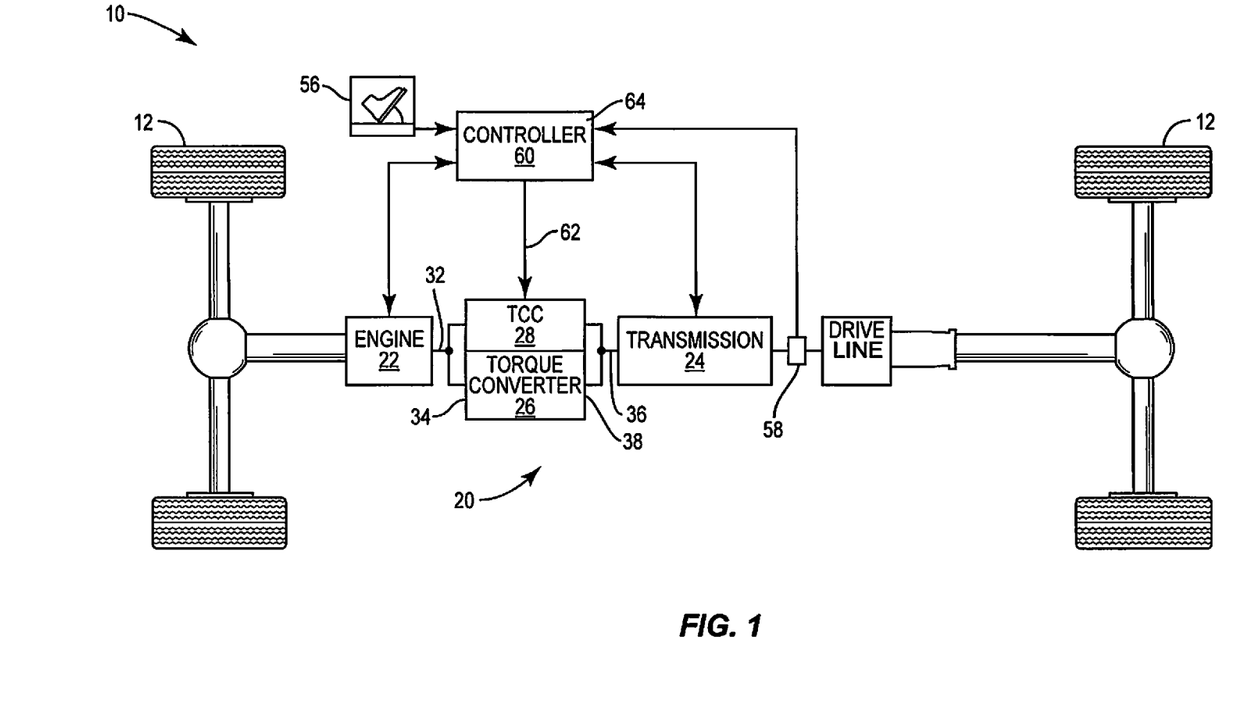
FIG. 1 is a diagram of components of one embodiment of a system in accordance with the principles of the present disclosure.
Figure 2:
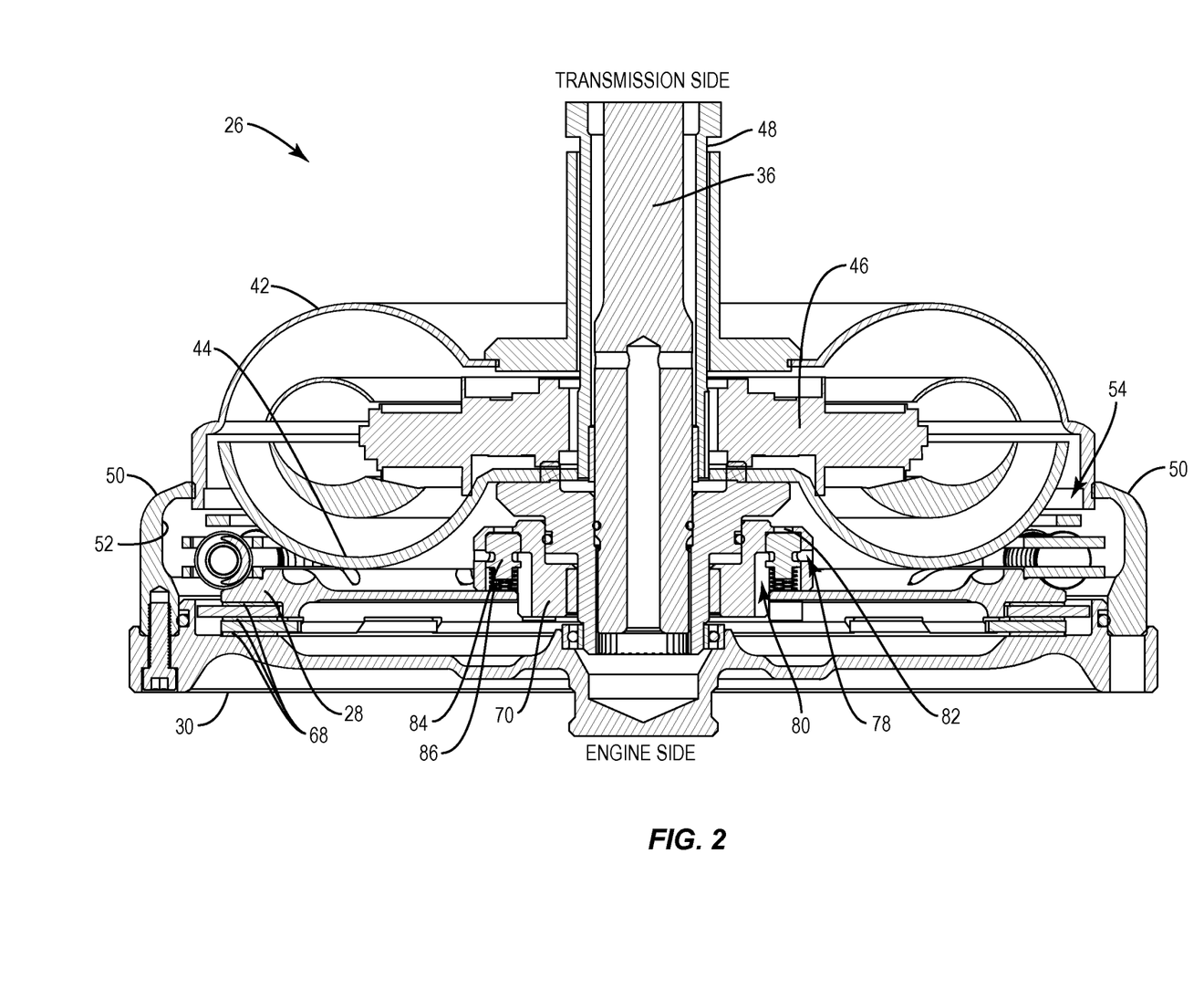
FIG. 2 is a side cross section view of components of the system shown in FIG. 1.

In operation, as shown in FIG. 1, controller 60 receives signals corresponding to vehicle operating conditions, which may include a throttle position signal from a vehicle throttle 56, such that controller 60 provides control signals to engine 22 for engine speed and torque related control, and signals to transmission 24 for shift related control. Depending on the vehicle operating conditions, controller 60 determines a target lockup strategy, such as, for example, a target slip based on vehicle operating conditions and provides a signal, such as, for example, the apply pressure command 62 to TCC 28.

The solenoid, as described herein, releases apply fluid pressure to the fluid pathway of torque converter 26, as shown by arrows B, C and D in FIG. 3, and communicates with hub 70 including pathways 78, 80, valve system 66 and TCC 28. The apply pressure engages a piston of TCC 28 and valve system 66, in the direction shown by arrows A in FIG. 3. Valve 84 is translatable for a modulated alignment, based on the apply pressure sensed by the proximal surface of valve 84, with openings 74, 76 for modulating the apply pressure, as described above with regard to FIGS. 3-6.

Valve 84 modulates under pressure and the bias of spring 86 in cooperation with groove 92, openings 74, 76 and cavity 72 to alter and/or tune lockup clutch application through manipulation of commanded apply pressure. In one embodiment, valve 84 and spring 86 have a selected configuration and dimension, which include valve diameter, valve area, spring rate and free spring height, to modulate exhaust orifice area 94 under a range of pressure, as shown by the graphical representation of area vs. pressure in FIG. 7. In some embodiments, valve 84 and spring 86 can be variously configured and dimensioned to modulate exhaust orifice area 94 under a range of pressure, as shown by the graphical representation of area vs. pressure in FIG. 8. In one embodiment, valve 84 and spring 86 have a selected configuration and dimension D1, which includes a valve diameter of approximately 0.4 inches, a valve area of approximately 0.125 inches, a spring rate of 56 pounds per inch and a free spring height of approximately 0.304 inches. In one embodiment, valve 84 and spring 86 have a selected configuration and dimension D2, which includes a valve diameter of approximately 0.4 inches, a valve area of approximately 0.125 inches, a spring rate of 52 pounds per inch and a free spring height of approximately 0.342 inches. In one embodiment, valve 84 and spring 86 have a selected configuration and dimension D3, which includes a valve diameter of approximately 0.4 inches, a valve area of approximately 0.125 inches, a spring rate of 43 pounds per inch and a free spring height of approximately 0.418 inches. In one embodiment, valve 84 and spring 86 have a selected configuration and dimension D4, which includes a valve diameter of approximately 0.4 inches, a valve area of approximately 0.125 inches, a spring rate of 38 pounds per inch and a free spring height of approximately 0.494 inches.

For example, as apply pressure is uniformly applied and/or uniformly increasingly applied, valve 84 axially translates between the first orientation and the second orientation, as described herein. As the apply pressure increases and engages the piston of TCC 28, friction plates 68 of TCC 28 engage casing 50 such that torque converter 26 is disposable in the fully locked mechanical coupling operating configuration and/or in a controlled slip operating configuration, as described herein. Valve system 66 resists or delays the effects of the apply pressure command 62 to temporarily maintain slip at the target lockup strategy selected by control module 64.

Figure 7:
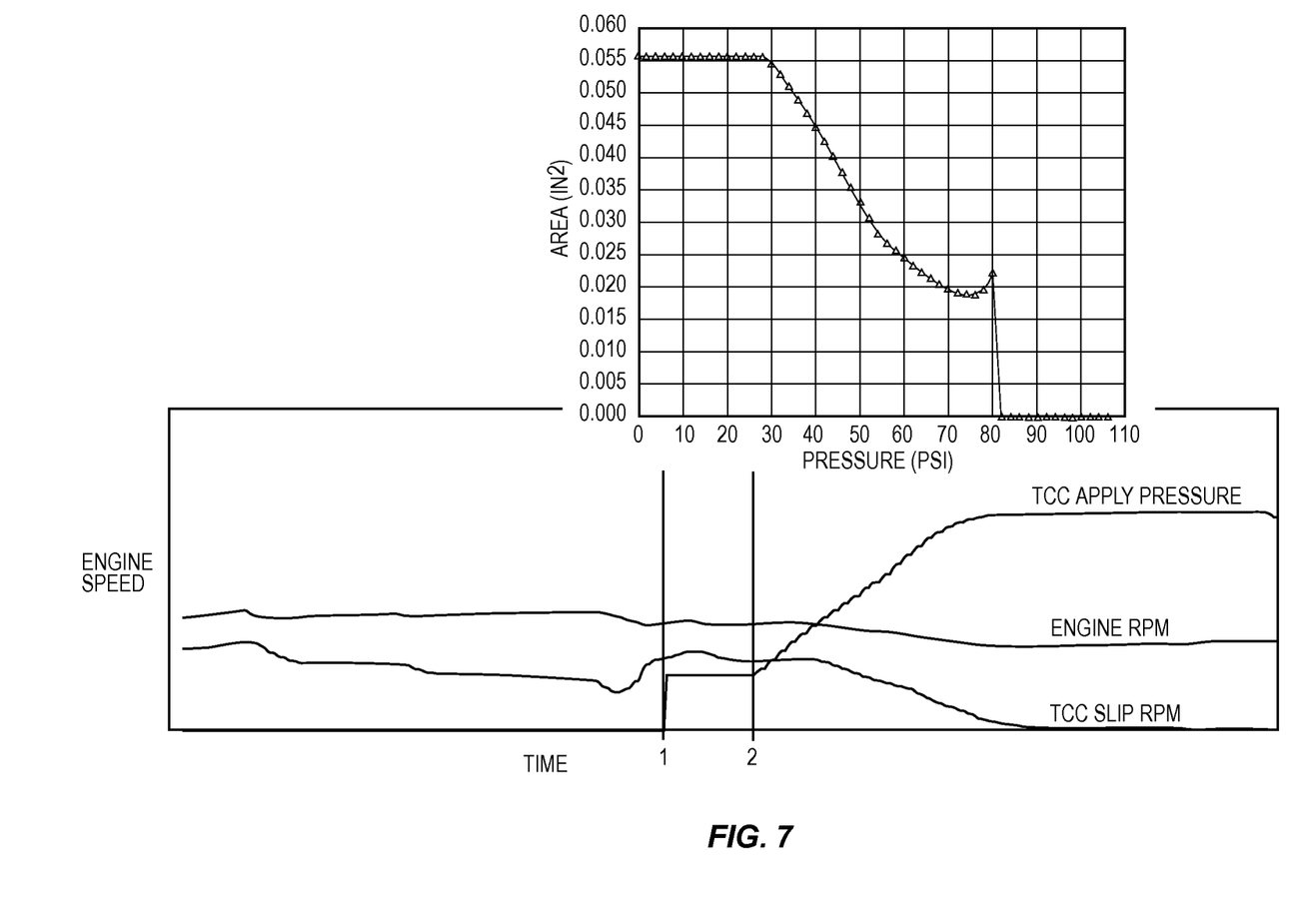
FIG. 7 is a graphical representation of engine speed versus time and area versus pressure of one embodiment of a system in accordance with the principles of the present disclosure.
Figure 8:
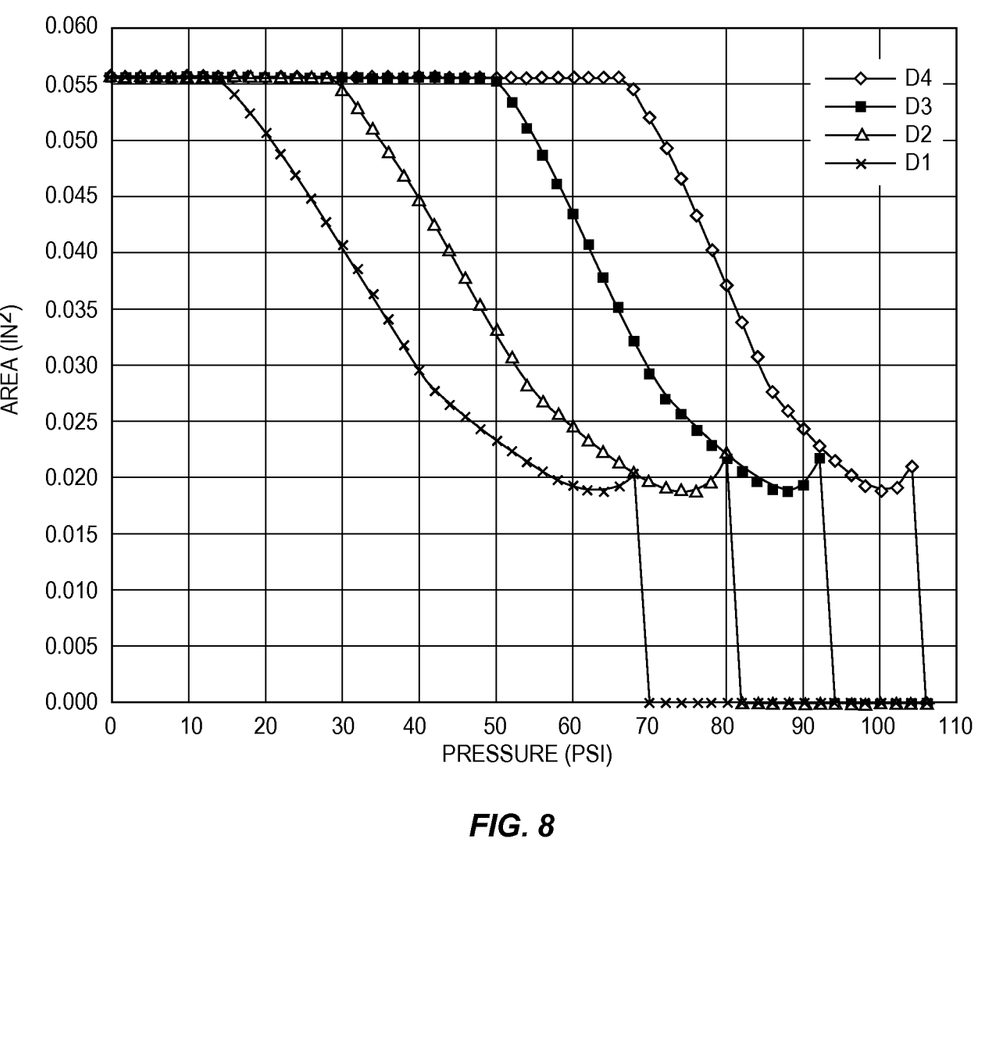
FIG. 8 is a graphical representation of area versus pressure of embodiments of a system in accordance with the principles of the present disclosure.

In one embodiment, for example, valve system 66 maintains targeted slip and valve 84 modulates apply pressure, as shown by the graphical representation of engine speed vs. time in FIG. 7. At time point 1, control module 64 initiates apply pressure command 62 to reduce the slip. From time point 1 to time point 2, solenoid releases fluid to apply pressure to reduce slip to achieve the target lockup strategy, for example, the target slip. Valve system 66 modulates apply pressure, as described herein to maintain target slip and gradually allow apply pressure to increase and substantially eliminate slip over time.

Fluid pressure can be applied to the release side of TCC 28, as shown by arrows E, F and G in FIG. 4, to disposed TCC 28 in the fully released fluid coupling operating configuration.

In some embodiments, controller 60 includes a feedback control module that monitors and controls the apply pressure corresponding to a target lockup strategy. The feedback control module employs a feedback control to monitor a desired value, control an output according to the desired value, and utilize a resulting value of the controlled output to subsequently improve control to the desired value. See, for example, U.S. Pat. No. 8,332,109, the entire contents of which being hereby incorporated by reference herein.

Figure 9:
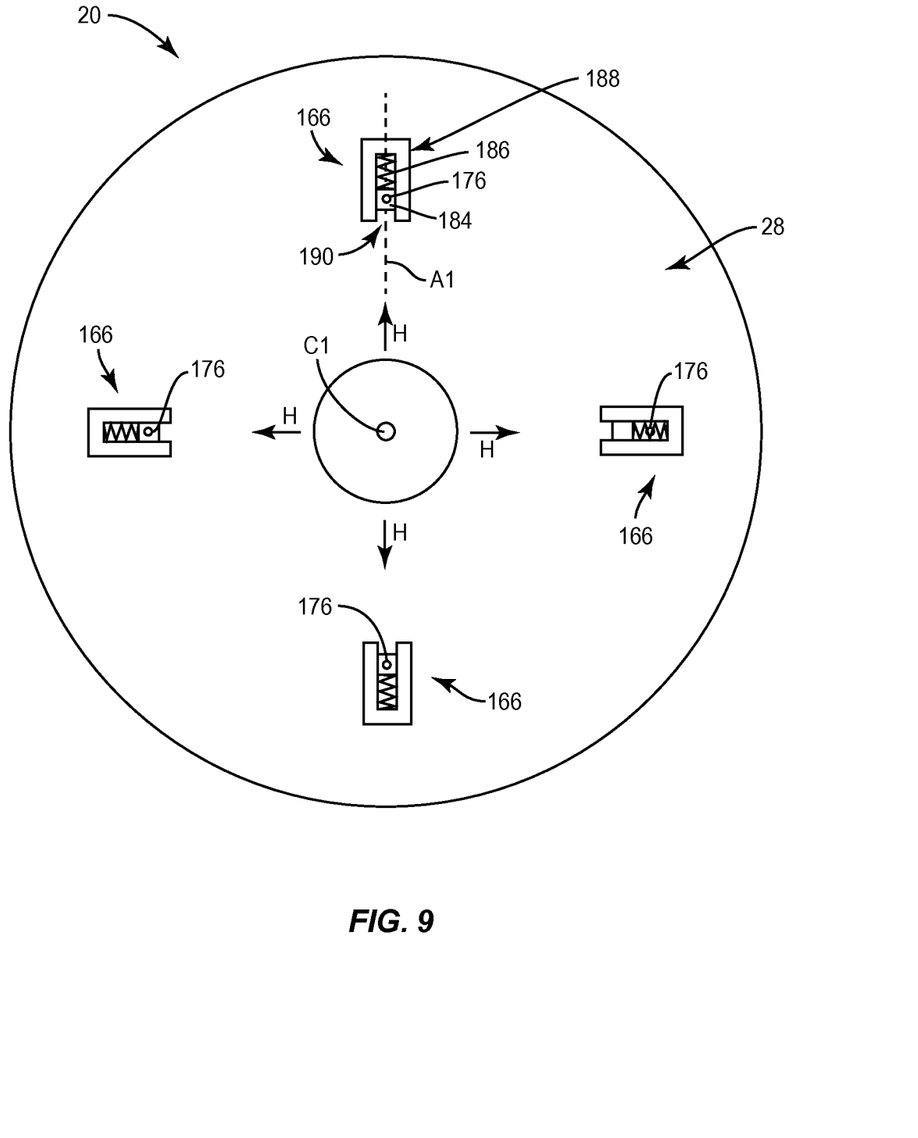
FIG. 9 is a plan view of components of one embodiment of a system in accordance with the principles of the present disclosure.

In one embodiment, as shown in FIG. 9, system 20, similar to the systems and methods described with regard to FIGS. 1-8, includes a pressure regulator, such as, for example, a plurality of centrifugally activated sprung mass 166. Each sprung mass 166 is configured to exhaust at least a portion of the apply pressure to modulate the apply pressure, as described herein. The plurality of sprung mass 166 are configured to tune clutch lockup behavior by regulating flow and/or pressure of fluid applied to TCC 28. Each sprung mass 166 is disposed adjacent an opening, such as, for example, an exhaust 176 (shown in phantom) defined by the piston of TCC 28, described above with regard to FIGS. 1-8. Each sprung mass 166 includes a spring 186, a mass 184 and a sprung mass retainer 188. Mass 184 and spring 186 are disposed within a cavity 190 of retainer 188. Cavity 190 defines an axis A1 disposed in substantially perpendicular alignment with a central axis C1 of TCC 28. Mass 184 is resiliently biased toward central axis C1.

As TCC 28 rotates, centrifugal forces cause mass 184 to translate, in a direction shown by arrow H, along axis A1 radially outward from central axis C1 to compress spring 186. Mass 184 is forced against spring 186 radially outward such that mass 184 opens and/or closes exhaust 176 for each sprung mass 166 to exhaust apply pressure. In some embodiments, mass 184 can adjust opening and/or closing of exhaust 176, such as, for example, in a uniform, constant, consistent, increasing, decreasing and/or gradual adjustment of the dimension of exhaust 176.

In one embodiment, system 20, similar to the systems and methods described herein, includes a pressure regulator that comprises a marcel spring or series of marcel springs configured to exhaust at least a portion of the apply pressure to modulate the apply pressure, as described herein. The marcel springs are integrated with a surface of TCC 28. In one embodiment, marcel springs are integrated as a resistive force applied to TCC 28. In one embodiment, the marcel spring provides a resistive force to the initial TCC 28 apply pressure.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A torque converter comprising:
an input connected to an engine;
an output connected with a transmission;
a lockup clutch connected with the output and being disposed to engage the input to couple the input with the output via an apply fluid pressure corresponding to a target lockup strategy based on at least one vehicle operating condition; and
a pressure regulator including at least one valve biased to an exhaust orientation and movable to a closed orientation such that the lockup clutch is engageable with the input, the at least one valve being disposed adjacent the lockup clutch and having a fluid pressure sensing surface, the fluid pressure being engageable with the fluid pressure sensing surface such that the at least one valve translates between the orientations to modulate the fluid pressure to the lockup clutch.

2. A torque converter as recited in claim 1, further comprising a hub connected with the lockup clutch and an input shaft of the output, the at least one valve being disposed with the hub.

3. A torque converter as recited in claim 1, wherein the at least one valve comprises a spool valve and a biasing member.

4. A torque converter as recited in claim 3, further comprising a hub connected with the lockup clutch and an input shaft of the output, the hub defining a cavity configured for disposal the at least one valve.

5. A torque converter as recited in claim 4, wherein the cavity defines a fluid pathway configured to exhaust at least a portion of the apply pressure for modulating the apply pressure.

6. A torque converter as recited in claim 4, wherein the hub defines an opening that facilitates application of the apply pressure to the at least one valve to cause translation of the at least one valve relative to the hub for modulating the apply pressure.

7. A torque converter as recited in claim 4, wherein the at least one valve is translatable for alignment with an entrance opening and an exit opening of the cavity for modulating the apply pressure.

8. A torque converter as recited in claim 7, wherein the at least one valve and the entrance and exit openings define an exhaust orifice area that modulates with apply pressure between a low torque capacity and a high torque capacity.

9. A torque converter as recited in claim 4, wherein the hub defines a plurality of cavities disposed circumferentially about the hub, each cavity being configured for disposal of a valve of the at least one valve.

10. A torque converter as recited in claim 1, wherein the pressure regulator includes a marcel spring disposed with the lockup clutch and being configured to resist apply pressure for modulating the apply pressure.

11. A torque converter as recited in claim 1, wherein the input includes a casing connected with a drive plate that communicates with the engine for transmitting engine torque to the transmission, the lockup clutch being engageable with the casing.

12. A torque converter as recited in claim 1, wherein the input includes a casing and an impeller and the output includes a turbine configured for fluid coupling with the impeller, the casing defining a cavity configured for disposal of the impeller and the turbine and the lockup clutch being engageable with the casing.

13. A torque converter as recited in claim 1, further comprising a controller that includes a closed loop feedback control module that monitors and controls the target lockup strategy with the apply pressure and a release pressure.

14. A torque converter as recited in claim 1, wherein the target lockup strategy includes a target slip.

15. A torque converter as recited in claim 1, wherein the lockup clutch is engageable with the input in a plurality of operating configurations that include a fully released fluid coupling, a fully locked mechanical coupling and a controlled slip coupling of the input and the output.

16. A torque converter as recited in claim 1, further comprising a hub connected with the lockup clutch and an input shaft of the output, the hub defining at least a portion of a fluid pathway, the least one valve being disposed in the fluid pathway and axially translatable between the exhaust orientation and the closed orientation.

17. A torque converter as recited in claim 1, further comprising a hub connected with the lockup clutch and an input shaft of the output, the hub defining at least one cavity configured for disposal of the at least one valve, the at least one cavity including an axial entrance opening, a lateral entrance opening and an exit opening.

18. A vehicle power transmitting system comprising:
an engine connected with a drive plate;
a transmission connected with an input shaft;
a torque converter including an impeller, a turbine and a casing connected with the drive plate, the casing including an inner surface that defines a cavity configured for disposal of the impeller and the turbine, the inner surface being integrally connected with the impeller and the turbine being connected with the input shaft,
the torque converter further including a lockup clutch connected with the turbine and being disposed to engage the casing to couple the impeller with the turbine via an apply fluid pressure corresponding to a target lockup strategy based on at least one vehicle operating condition;
a controller that includes a closed loop feedback control module that monitors and controls the target lockup strategy with the fluid pressure and a release pressure; and
a pressure regulator including at least one valve biased to an exhaust orientation and movable to a closed orientation such that the lockup clutch is engageable with the input, the at least one valve being disposed adjacent the lockup clutch and having a fluid pressure sensing surface, the fluid pressure being engageable with the fluid pressure sensing surface such that the at least one valve translates between the orientations to modulate the fluid pressure to the lockup clutch without modifying the control module.

19. A vehicle power transmitting system as recited in claim 18, wherein the at least one valve comprises a spool valve and a biasing member.

20. A method for modulating a torque converter clutch, the method comprising the steps of:
providing a power transmitting system comprising a torque converter including a lockup clutch connected with an output and engageable with an input to couple the input with the output, the torque converter further including a pressure regulator including at least one valve biased to an exhaust orientation and movable to a closed orientation such that the lockup clutch is engageable with the input, the at least one valve being disposed adjacent the lockup clutch and having a fluid pressure sensing surface, the power transmitting system further comprising a control module;
monitoring at least one vehicle operating condition of the power transmitting system with the control module such that the control module selects a target clutch lockup strategy;
generating a pressure command from the control module based on the strategy such that an apply fluid pressure is applied to the clutch; and
engaging the fluid pressure with the fluid pressure sensing surface such that the at least one valve translates between the orientations to modulate the clutch engagement with the input.

* * * * *